US008447856B2

(12) United States Patent
Drako (10) Patent No.: US 8,447,856 B2
(45) Date of Patent: May 21, 2013

(54) POLICY-MANAGED DNS SERVER FOR TO CONTROL NETWORK TRAFFIC

(75) Inventor: Dean Drako, Los Altos, CA (US)

(73) Assignee: Barracuda Networks, Inc., Campbell, CA (US)

( * ) Notice: Subject to any disclaimer, the term of this patent is extended or adjusted under 35 U.S.C. 154(b) by 647 days.

(21) Appl. No.: 12/323,379

(22) Filed: Nov. 25, 2008

(65) Prior Publication Data

US 2010/0131646 A1 May 27, 2010

(51) Int. Cl.
*G06F 15/16* (2006.01)
(52) U.S. Cl.
USPC ............ 709/225; 709/203; 709/219; 709/229
(58) Field of Classification Search
USPC .............. 709/225, 203, 217–219, 223, 227, 709/229, 245; 707/781–788; 713/182–187; 715/741–743
See application file for complete search history.

(56) References Cited

U.S. PATENT DOCUMENTS

| | | | | |
|---|---|---|---|---|
| 6,381,627 B1 * | 4/2002 | Kwan et al. | ................... | 709/201 |
| 6,781,972 B1 * | 8/2004 | Anderlind et al. | ............ | 370/329 |
| 6,961,783 B1 * | 11/2005 | Cook et al. | .................... | 709/245 |
| 7,536,715 B2 * | 5/2009 | Markham | ........................ | 726/11 |
| 7,623,518 B2 * | 11/2009 | Faulk, Jr. | ....................... | 370/392 |
| 7,698,377 B2 * | 4/2010 | Parekh et al. | .................. | 709/217 |
| 2005/0022008 A1 * | 1/2005 | Goodman et al. | ............ | 713/201 |
| 2005/0039003 A1 * | 2/2005 | Wray | ............................ | 713/166 |
| 2005/0235044 A1 * | 10/2005 | Tazuma | ........................ | 709/217 |
| 2008/0008299 A1 * | 1/2008 | Didcock et al. | ............ | 379/88.16 |
| 2008/0270363 A1 * | 10/2008 | Hunt et al. | ......................... | 707/3 |
| 2008/0276313 A1 * | 11/2008 | Kummu et al. | ................. | 726/22 |

OTHER PUBLICATIONS

P. Mockapetris, RFC 1035—Domain Names—Implementation and Specif, Nov. 1987, Network Working Group, IETF, www.rfc-editor.org/rfc/rfc1035.txt.*

* cited by examiner

*Primary Examiner* — Ruolei Zong
(74) *Attorney, Agent, or Firm* — Patentry (57) ABSTRACT

Disclosed is a method, a computer system, and a computer-readable media product that contains a set of computer executable software instructions for directing the computer to execute a process for policy-based operation of a DNS server apparatus to manage traffic due to undesirable mail or requests for electronic documents. The policies operate according to owners, regions, or countries controlling source IP addresses and deterministically select from a plurality of non-equivalent replies to be sent to the source IP address. Accumulating previous activity records may assist in determining which traffic may be usefully deferred or suppressed. The process includes withholding certain information from certain DNS servers seeking IP addresses to improve overall security and integrity of the Internet.

5 Claims, 12 Drawing Sheets

POLICY-MANAGED DNS SERVER FOR TO CONTROL NETWORK TRAFFIC

BACKGROUND

One of the foundations of Internet communications is the Domain Name System (DNS) which enables applications to find resources on the Internet via hostnames which are human-friendly names for servers rather than the dot-decimal notation Internet Protocol addresses comprising numeric labels punctuated with full stops used to route data.

It is known that a conventional DNS server may select from a plurality of equivalent mirrored hosts to improve performance by selecting a host according to network topology. Thus an instance of a mirrored host which has a high bandwidth connection to the client and low latency is a conventional selection to optimize customer satisfaction in responsiveness. Similarly, if too much traffic is loading down a specific host, a conventional load balancing DNS server may select from lesser loaded hosts which can provide a better user experience. In both cases the DNS server provides every requestor an IP address and selects the provided IP address according to effective or estimated network latency.

A conventional DNS server responds with an IP address when a query is made. The authoritative DNS server will give a response to whoever makes a request. The response is the proper IP address of a machine which hosts the specified service for the requested domain. Examples are the A record for websites and the MX record for mail. Unless otherwise configured, a conventional DNS server will attempt to find data it does not have by making a recursive query to another DNS server.

The term policy as used in the present application is consistent with its meaning to those skilled in the art of network management. The Internet Society has provided the following definitions in RFC3198-Terminology for Policy-Based Management, A. Westerineh et al, (c)2001 Network Working Group, Definition List 1

| Term | Definition |
|---|---|
| $ outsourced policy | An execution model where a policy enforcement device issues a query to delegate a decision for a specific policy event to another component, external to it. |
| $ policy | A set of rules to administer, manage, and control access to network resources. |
| $ policy condition | A representation of the necessary state and/or prerequisites that define whether a policy rule's actions should be performed. This representation need not be completely specified, but may be implicitly provided in an implementation or protocol. When the policy condition(s) associated with a policy rule evaluate to TRUE, then (subject to other considerations such as rule priorities and decision strategies) the rule should be enforced. A rule's conditions can be expressed as either an ORed set of ANDed sets of statements (disjunctive normal form), or an ANDed set of ORed sets of statements (conjunctive normal form). Individual condition statements can also be negated. |
| $ policy repository | A specific data store that holds policy rules, their conditions and actions, and related policy data. A database or directory would be an example of such a store. |
| $ policy rule | A basic building block of a policy-based system. It is the binding of a set of actions to a set of conditions, where the conditions are evaluated to determine whether the actions are performed. |
| $ rule based engine | A rule based engine is able to evaluate policy condition(s) and trigger appropriate policy actions. |

It is known that the architecture of conventional DNS servers are susceptible to an attack called cache poisoning. In this attack, one or more DNS clients under the control of the attacker floods a DNS server with queries to force it to start many transactions with authoritative servers and the attacker simultaneously floods the DNS server with forged replies.

A conventional DNS server will provide a reply to any client sending a request for which it has stored resource records of the correct type. A conventional DNS server can be configured to cache resource records for queries it has resolved previously. A conventional DNS server can be an authoritative server for certain domains and have multiple resource records of a single type for a domain for load balancing purposes. A conventional DNS server can be configured to randomly select one or send all resource records of a single type for load balancing purposes to any query from any source.

By analogy, consider the telephone system where any caller may dial any mobile telephone number however mobile telephone numbers are not listed in the white pages of the telephone directory. DNS is similar to the directory or white pages. Any number can call any other number, however not all numbers are listed in the directory just as all IP addresses do not have to be listed in DNS. Consider further that if the telephone directory could provide a different number to the person looking up based on who they were and the situation, fewer unwanted calls would be connected. Similar to the secretary who may or may not give out their boss's number based upon who the requester is, or the circumstances. These circumstances and the identity of the requester make up a policy.

The intentional openness of the DNS architecture makes it usable by malicious intruders, spammers, and denial of service attackers. Under many circumstances it may be desirable to give different responses to DNS requests according to the source of the DNS query. Examples include excluding suspected bad actors from finding your hosts, preventing delivery of spam, excluding competitors from accessing your product support downloads and documentation, preventing agents of foreign powers from attempting to access your network, and protecting your dns server from bogus queries designed to poison cache.

What is needed is a system, apparatus, and method for DNS servers to select from a plurality of potential dns replies according to the source of the query and other circumstances including but not limited to the ability to ignore certain senders of DNS queries.

SUMMARY OF THE PREFERRED EMBODIMENTS

The foregoing and other problems are addressed and solved by methods and apparatus in accordance with the teachings of this invention.

The invention disclosed in the present application is an apparatus for a policy-based Domain Name System (commonly called DNS) server to control network traffic. It is an apparatus comprising a processor implementing an informed DNS server application program using a policy engine. The policy, encoded on computer readable media, may be locally provisioned or accessed remotely.

Specific traffic on the Internet may be undesirable to some. A key resource in sending traffic which utilizes the TCP and IP protocols is the Domain Name System (DNS). The present invention adds an informational resource to enable the DNS servers to make informed decisions about queries and replies. The present invention adds the concept of policy to the responses of a Domain Name System (DNS) server. The present invention comprises a policy engine for a DNS server.

Disclosed is a method, a computer system, and a computer-readable media product that contains a set of computer executable software instructions for directing the computer to execute a process for policy-based operation of a DNS server apparatus to manage traffic. The policies operate according to owners, regions, countries controlling source IP addresses, time of day, or other data, and deterministically select from a plurality of non-equivalent replies to be sent to the source IP address or algorithmically generate a reply. Central to the invention is a computer-readable media product that contains a set of computer executable software instructions for directing the computer system to execute a process for policy-based operation of a DNS server apparatus whereby a reply to a DNS query from a sender is selected or generated according to the source IP of the sender or other information of the DNS query.

The present invention enables facilitating traffic which is mutually desired between sender and receiver and eliminating traffic that heretofore is placed unwillingly on one by the other at little cost or consequence.

The present invention comprises an informed decision step in processing a DNS request whereby a rule may be chosen according to the IP source of the DNS UDP packet request. In an embodiment, the list of IP addresses includes at least one of: lists of known or suspected spammers, lists of infected computers, lists of hostile governmental or non-governmental agents, lists of commercial competitors, lists of untrusted zones, lists of trusted senders, lists of heavy utilizers of limited bandwidth, lists of preferred or premium quality of service clients, or likely geographic location of requesters. An informed DNS step may be incorporated into existing DNS servers by adding routines or software into an existing DNS server. The policy provided to the DNS policy engine is to shape the response to a DNS query according to the source of the query or other available information such as time of day or reverse DNS lookup. A list of IP addresses which serve bots and webcrawlers may be consulted to deny access to said bots and webcrawlers. A reply can be generated according to the time of day, day of week, or the region served by a the IP address of a requestor.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DISCLOSURE OF EMBODIMENTS IN A COMPUTER SYSTEM

In some cases it is desirable to make it more difficult for certain computers to access your resources by either receiving information from your network or transmitting information into your network. It may be that competitors, agents of foreign governments, or residents of certain geographies are undesired visitors. The present invention comprises implementing a DNS server which respects a policy comprising inspecting the source IP of a DNS query and according to a policy, delivering a reply selected from a group of pre-replies, or algorithmically generating a reply.

An embodiment of the invention is an apparatus for providing domain name system query service comprising a provisioned policy engine comprising at least one policy rule that denies access by sending a useless IP address in reply to a dns query by applying a rule to the source IP of the DNS request.

An embodiment of the invention is an apparatus for providing domain name system query service comprising an outsourced policy engine coupled through a network to a policy-based DNS server apparatus which evaluates a policy decision based on the source IP address of a DNS query or other information such as time of day or information in a database about the source IP.

An embodiment of the invention is a method of operating a domain name system query service apparatus further comprising a rule based engine tangibly embodied as software controlling a processor to perform the steps following: receive a DNS query and read its source IP from the header, evaluate a rule based on the referencing the source IP against an algorithm, apply an action according to the rule which responds to the query with a prereply or an algorithmically generated reply.

An embodiment of the invention is a method of policy translation for providing executable modules to a policy engine comprising the steps of converting an abstract policy on spam, abusive users, sources of malicious software to ranges of IP addresses for use by a policy engine in a domain name system server apparatus.

An embodiment of the invention is an apparatus for providing domain name system service further comprising a policy decision point comprising a plurality of rules, a rule evaluation engine, and an algorithm for determining IP addresses with ranges to be referenced by the rules.

A computer implemented embodiment of the invention is a software method for creating a policy rule for a policy-managed DNS server comprising binding at least one of the following actions to the condition that the source of a DNS request is found in a list of undesirable IP addresses:

transmitting a code for no such address found;
transmitting a loopback address;
transmitting a fictitious address;
transmitting an address to a fixed message
transmitting a fixed IP address; and
no reply at all.

A computer implemented embodiment of the invention is a software method for operating a policy-based DNS server apparatus as a policy enforcement point comprising the step of sending a policy decision request containing a source IP address to a policy decision point and receiving at least one action.

A tangible embodiment, encoded as a software product on computer readable media controls a processor to perform a method of operating an apparatus for providing DNS service by referencing a a policy group comprising a plurality of rules selected from a rule on IP addresses located in countries, a rule on IP addresses within a range of a spammers' known activity, a rule on a list of IP addresses controlled by commercial or governmental entities, a rule on IP addresses associated with open proxies, and a rule on IP addresses controlled by certain authorities and providing a valid result only if all rules evaluate as false.

In a preferred embodiment, finding a source IP on a list results in sending a reply in the form of a loopback address which minimizes further network traffic. In an embodiment, finding a source IP on a list results in sending a "not found" reply code. In an embodiment, finding a source IP on a list results in sending a bogus reply of a fictitious address. In an embodiment, finding a source IP on a list results in sending no reply at all.

In an embodiment, the DNS server is enabled to respond to an MX record lookup according to a list of IP's of suspected spammers by sending a tailored reply. In an embodiment, a list of IP's of computers suspected to have viruses, malware, open relays, or poor security controls may be prevented from connecting by a tailoring the DNS reply. The objective of the invention is to deny known spammers knowledge of the IP address of the protected mail server.

In an embodiment the present invention is a method for informed DNS-based traffic control comprising the steps of
  receiving a dns request via UDP from a DNS server or client;
  outsourcing a policy decision to at least one of: an algorithm operating on IP addresses, a list of IP addresses, a database of ranges and masks, a database of IP addresses controlled by countries, a database of IP addresses controlled by commercial competitors, an active list of spammers, and a block list;
  and replying to DNS UDP request based on the policy.

In an embodiment the present invention is a method for informed DNS-based traffic control comprising;
  receiving a DNS UDP request;
  finding a source IP in a list;
  and selecting from a list of responses according to policy, the list comprising, in an embodiment:
  1. no reply,
  2. deny existence and set TTL to 1 month,
  3. refer to a DNS server which is fictitious, and
  4. refer to another DNS server who pseudo-randomly selects from same list.

In an embodiment the present invention is a method for informed DNS-based traffic control comprising the steps of
  receiving a list of IP addresses and query types.
  receiving a DNS UDP request,
  requesting an IP address from a DNS server,
  receiving a reply and comparing it with the list of IP addresses and query types,
  and suppressing a reply if there is a match.

In an embodiment, a blocking response is an IP address selected from the group of loopback IP addresses. In an embodiment, a blocking response is the IP address of a server configured to return a message to inform the client that content has been blocked. In an embodiment, multiple blocking categories are disclosed wherein appropriate blocking categories are determined by the IP address which results from the lookup. In an embodiment, multiple blocking categories are disclosed wherein appropriate blocking categories are determined by the IP address of the source of the request.

A range of source IP addresses which is close to a source IP address which is undesirable may be embedded in a policy such as by bitmask or slash bit notation.

In an embodiment of the invention, a DNS server will "play dumb" and not provide any reply at all to queries which originate from a range of source IP addresses. This can be accomplished by using a bit mask or slash bit notation (CIDR).

In an embodiment of the invention, a DNS server will have predefined codes or messages if a policy rule on a source IP address is triggered. In an embodiment, a reply to a query from a source IP address will direct a browser to an IP address which displays a message via text or html. For the purpose of this patent application we define a source IP as one of a IPv6 and a IPv4 format address found in the header of a UDP packet which contains a DNS query. In an embodiment the process comprises evaluating logic operating on the day of the week and time of day. In an embodiment the process comprises evaluating logic operating on query type and query name. In an embodiment the process comprises transmitting the IP source address to a database for information and evaluating logic operating on the result received. In an embodiment the process comprises transmitting the IP source address to a reverse DNS lookup service and evaluating logic operating on one of the absence of a returned value, the start of authority of the domain name, and the fully qualified domain name recorded in the reverse DNS lookup database.

In an embodiment, a rule can operate on any information in a UDP header and determine a selection from a plurality of DNS replies.

Figure 1:
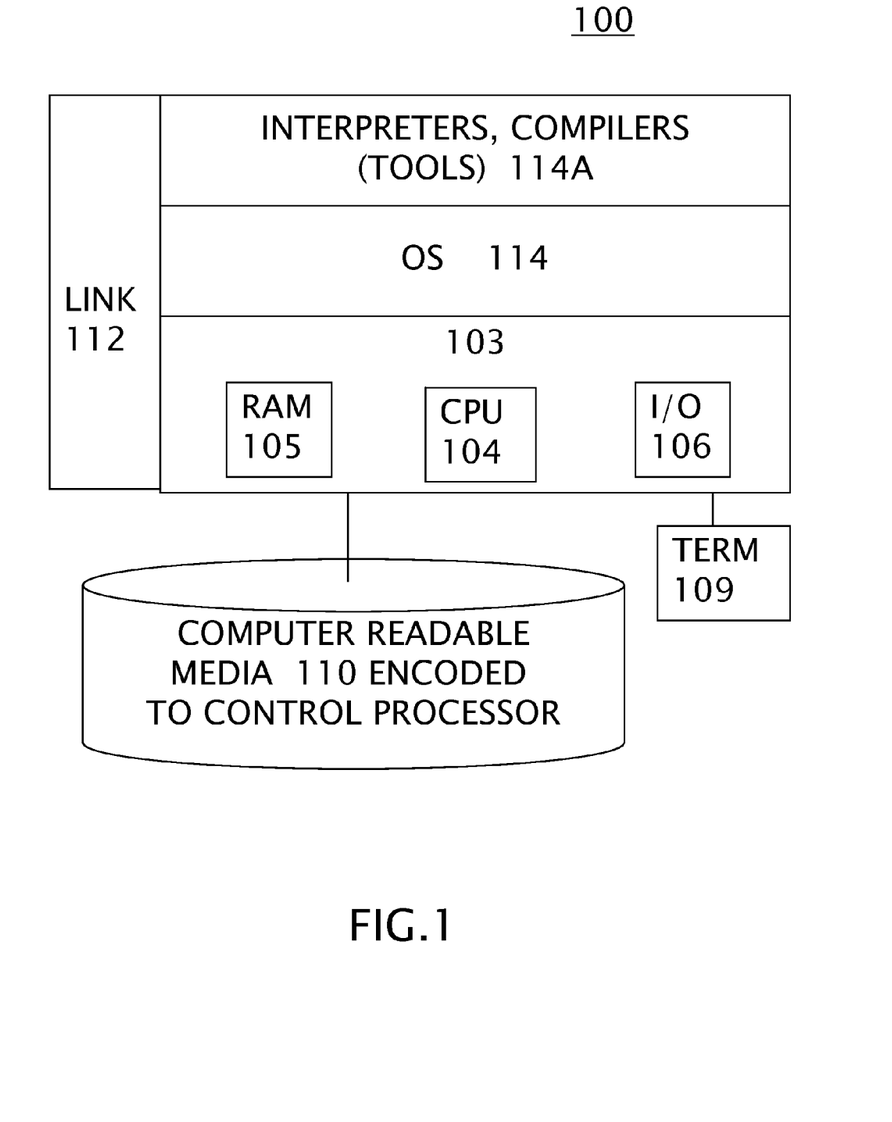
FIG. 1 is a block diagram of a data processor suitable for the implementation of this invention.

FIG. 1 shows a block diagram of a typical computing system 100 where the preferred embodiment of this invention can be practiced. The computer system 100 includes a computer platform having a hardware unit 103, that implements the methods disclosed below. The hardware unit 103 typically includes one or more central processing units (CPUs) 104, a memory 105 that may include a random access memory (RAM), and an input/output (I/O) interface 106. Various peripheral components may be connected to the computer platform. Typically provided peripheral components include a terminal 109, an external data storage device (e.g. tape or disk) 110 where the data used by the preferred embodiment is stored. A link 112 may also be included to connect the system 100 to one or more other similar computer systems. The link 112 may also provide access to the global Internet. An operating system (OS) 114 coordinates the operation of the various components of the computer system 100, and is also responsible for managing various objects and files, and for recording certain information regarding same. Lying above the OS 114 is a software tools layer 114A containing, for example, compilers, interpreters and other software tools. The interpreters, compilers and other tools in the layer 114A run above the operating system and enable the execution of programs using the methods known to the art.

One suitable and non-limiting example of computer system 100 is the Barracuda(™) Spam Firewall (trademark of Barracuda Networks, Inc.) or a PC running Linux. An example of a suitable CPU is a Pentium(™) III processor (trademark of the Intel Corporation); examples of an operating systems is GNU/Linux; examples of an interpreter and a compiler are a Perl interpreter and a C++ compiler. Those skilled in the art will realize that one could substitute other examples of computing systems, processors, operating systems and tools for those mentioned above. As such, the teachings of this invention are not to be construed to be limited in any way to the specific architecture and components depicted in FIG. 1.

Figure 2:
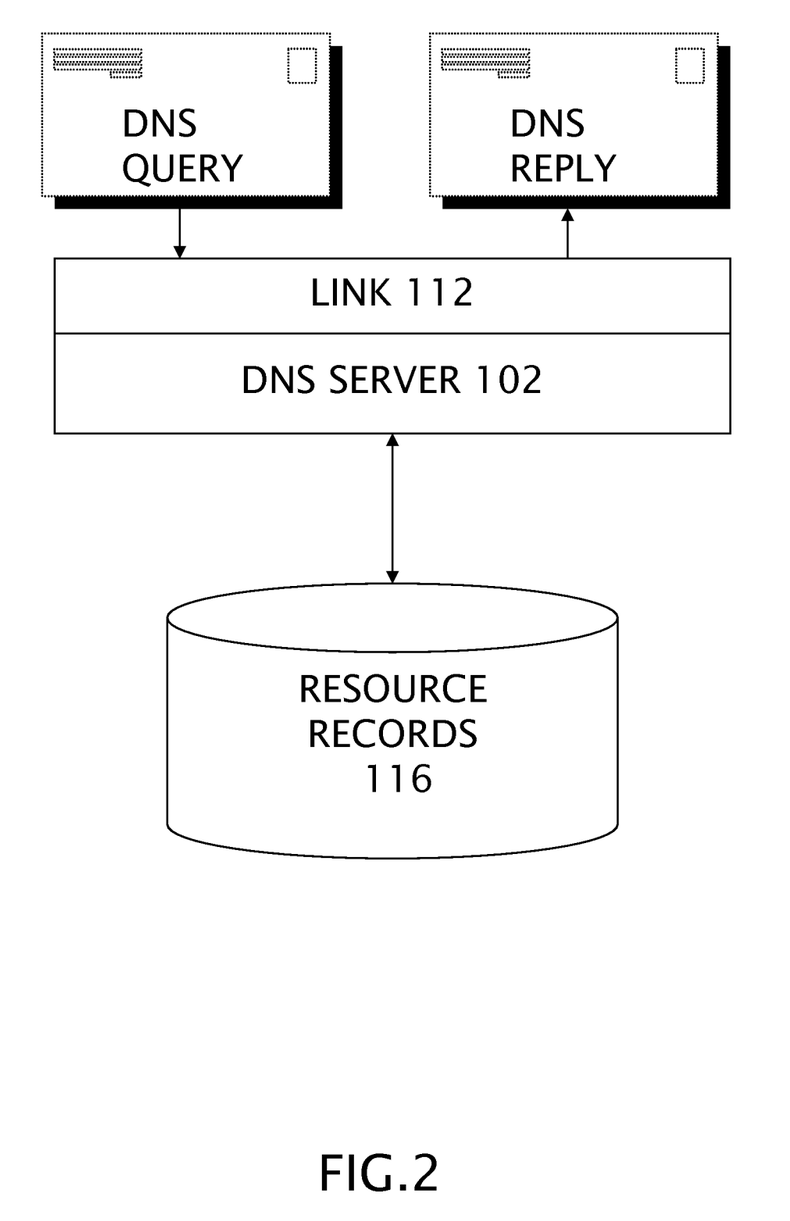
FIG. 2 is a block diagram illustrating the data flow in a conventional DNS server.

Referring now to FIG. 2 a block diagram shows a conventional DNS server apparatus 102 which connects to the Internet and receives a DNS query packet via a link 112. The DNS query packet asks for a certain Resource Record encoded on computer-readable media 116. A conventional DNS server 102 provides the requested resource record in a DNS reply packet to the requesting IP source address of the DNS query packet. There are provisions for responding to a request for which the DNS server 102 cannot find a resource record 116 which do not concern the present patent application and which are known in the art.

Figure 3:
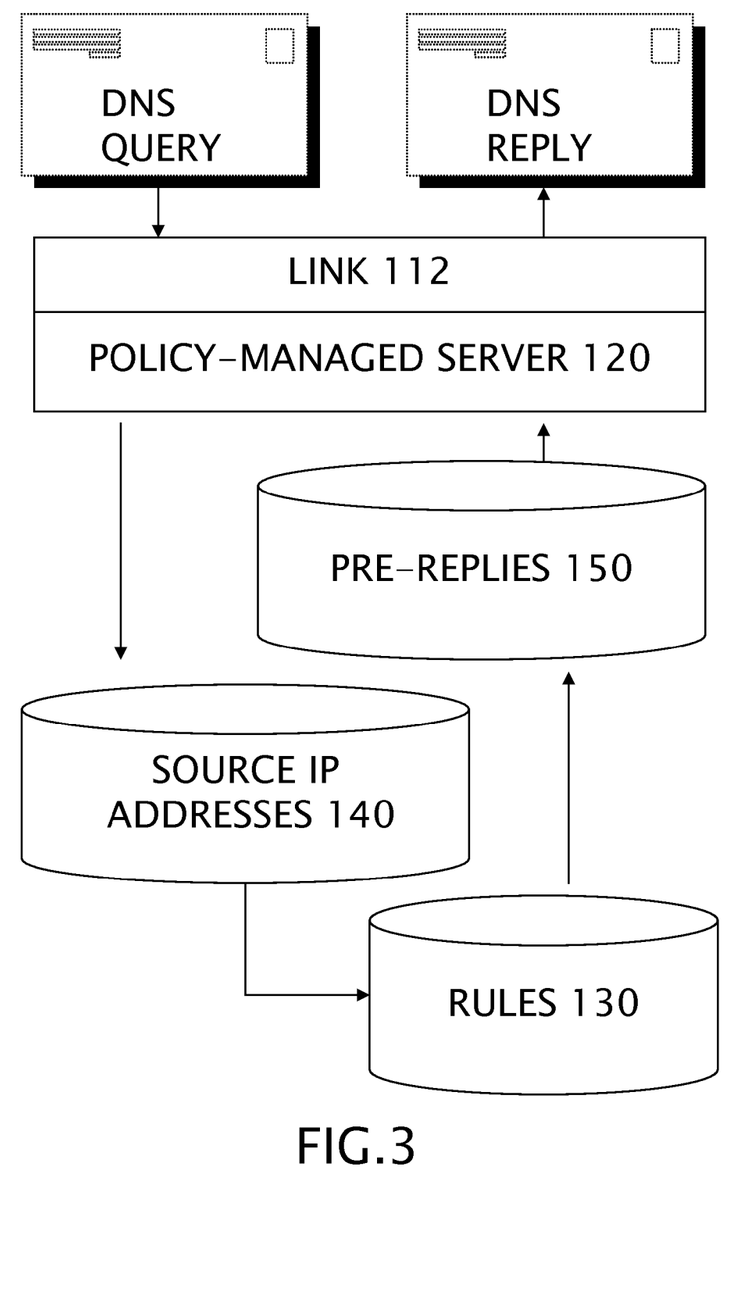
FIGS. 3-6 are block diagrams of embodiments of the apparatus disclosed.

Referring now to FIG. 3, a best mode embodiment of the present invention is shown in a block diagram. As before a DNS query is received via a link 112 by a policy-managed server 120 which reads a source IP address from the DNS query packet header. The present invention is distinguished from a conventional DNS server by comparing the received source IP address with source IP addresses encoded on computer readable media 140. In an embodiment comparison is done with bit masks or by selected prefix bits of size N. The result of the source IP address comparison selects at least one rule from a group of rules encoded on computer-readable media 130. In an embodiment a plurality of rules may be selected. In an embodiment, a default rule is selected when no match occurs between the received source IP address and source IP addresses encoded on computer readable media 140. The policy-managed server 120 applies values read from the DNS query packet, if needed, to evaluate at least one rule. Each rule calls for selection of a certain pre-reply encoded on computer readable media 150. A policy-managed server will follow the most restrictive rule of a plurality of rules which evaluate as true. As a result, the selected pre-reply is transmitted via the link 112 in a DNS reply to the source IP address of the DNS query. It is understood that computer-readable media 130, 140, and 150 may share one or more physical volumes or exist in memory without departing substantially from the disclosed invention.

Figure 4:
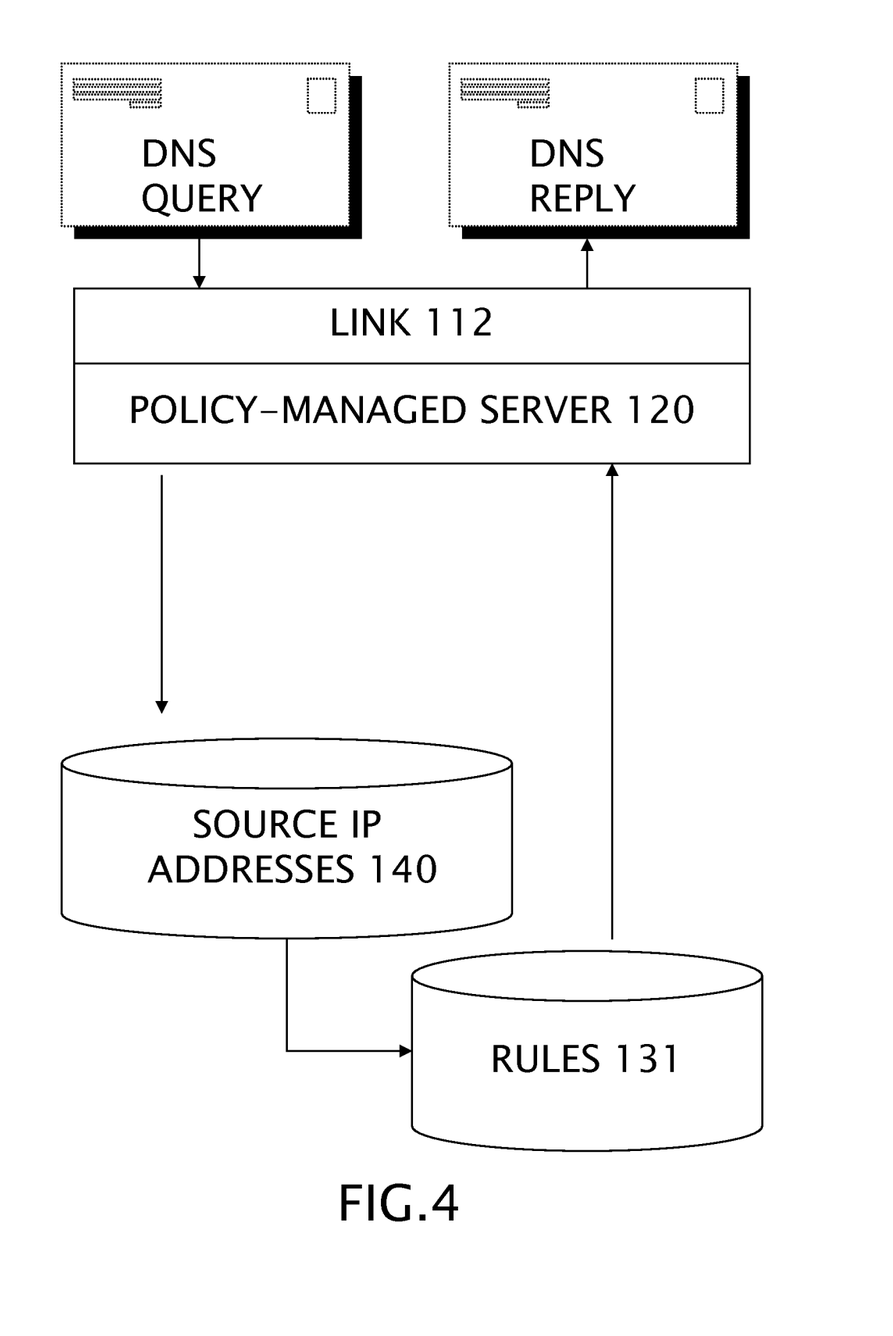

Referring now to FIG. 4, an embodiment of the invention shows rules encoded on computer-readable media 131 which have pre-replies embedded in each rule. If there are relatively few rules, or few pre-replies, this is a simplification without departing substantially from the disclosure of the best mode.

Figure 5:
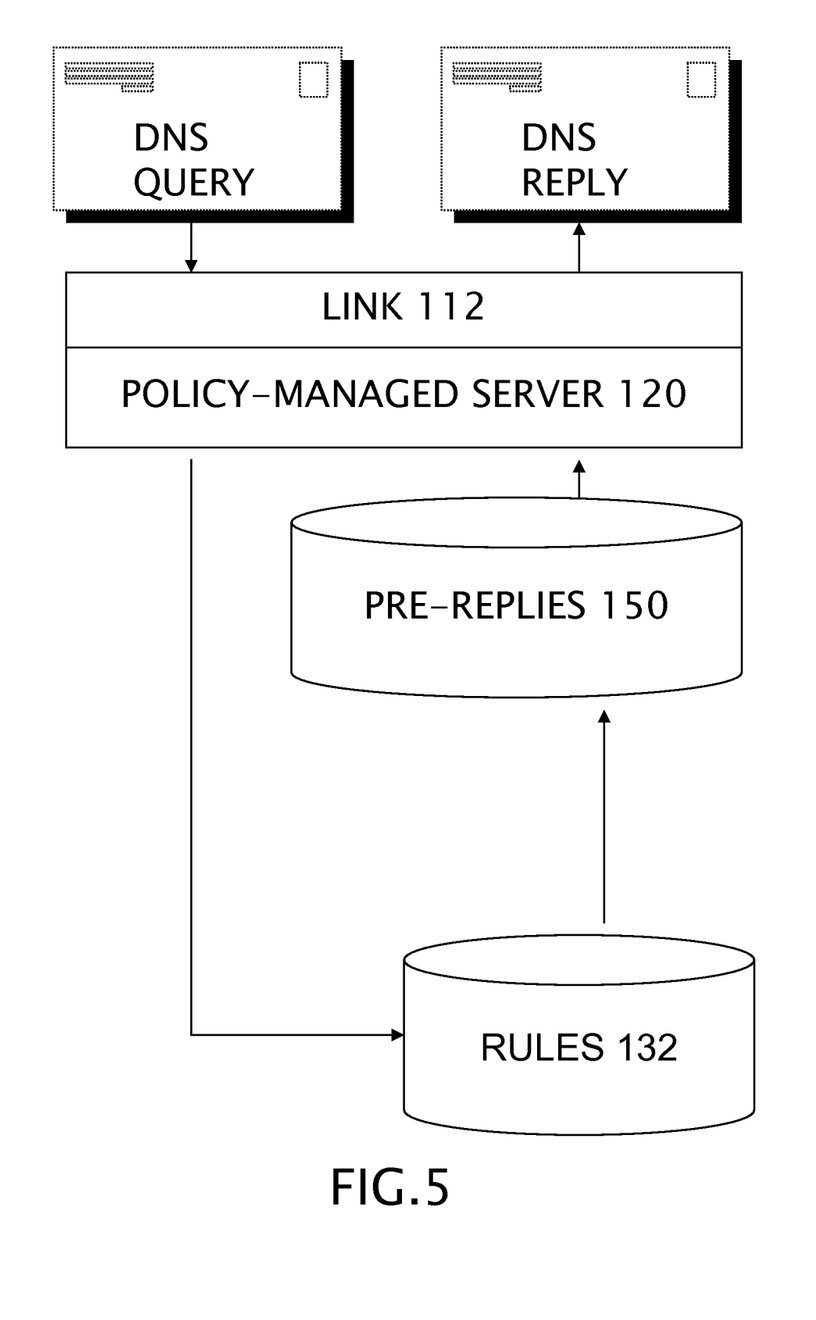

Referring now to FIG. 5, an embodiment of the invention shows rules encoded on computer-readable media 132 which have source IP addresses embedded in each rule. If there are relatively few rules, this is a simplification without departing substantially from the disclosure of the best mode. Rules which use wildcards or bitmasking can be evaluated against many IP addresses efficiently in this embodiment.

Figure 6:
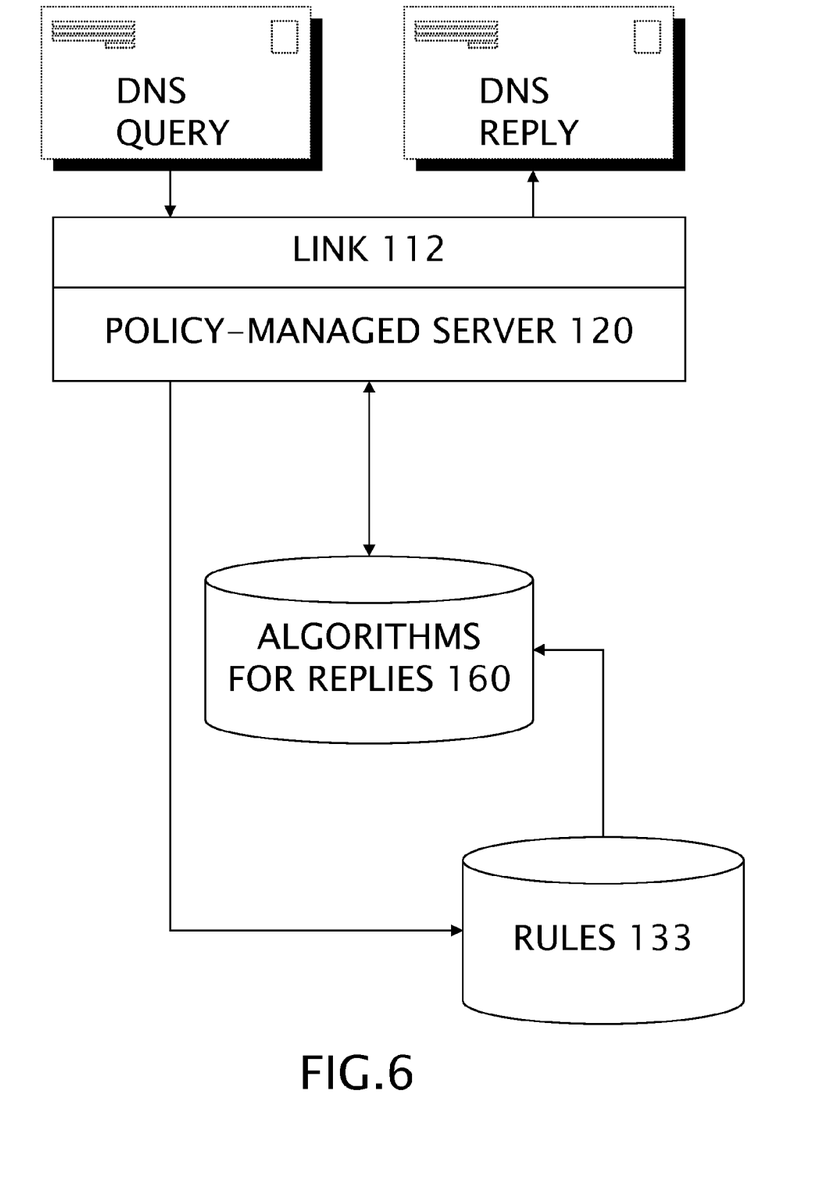

Referring now to FIG. 6, an embodiment of the invention shows rules encoded on computer-readable media 133 which have information for generating a reply and IP addresses embedded in each rule. If there are relatively few rules, this is a simplification without departing substantially from the disclosure of the best mode. In an embodiment the conventional resource records are used to formulate the reply if no rules are evaluated as true. In an embodiment, the rules provide information for the step of algorithmically generating a reply. This can provide localized, regionalized, or language-specific replies to globally dispersed policy managed servers with algorithms for generating replies 160.

Figure 7:
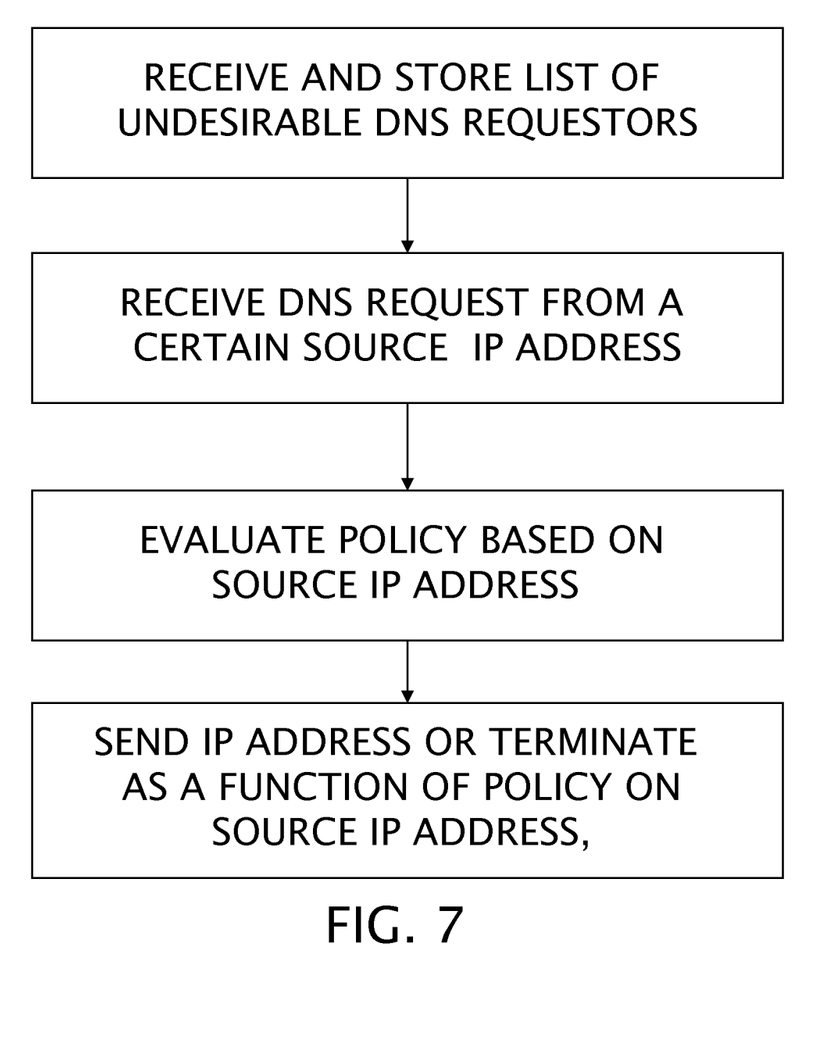
FIGS. 7-12 are flow charts of embodiments of the method disclosed.

Referring now to FIG. 7, a flowchart is disclosed of the present invention comprising the steps of receiving a list of undesirable DNS requesters and storing them in a database on computer readable media accessible to a processor; receiving a DNS request from a certain source IP address; evaluating the policy based on the source IP address of the DNS request; and based on the policy decision, terminating the DNS request without a reply or providing the requested IP address in reply to the query.

Figure 8:
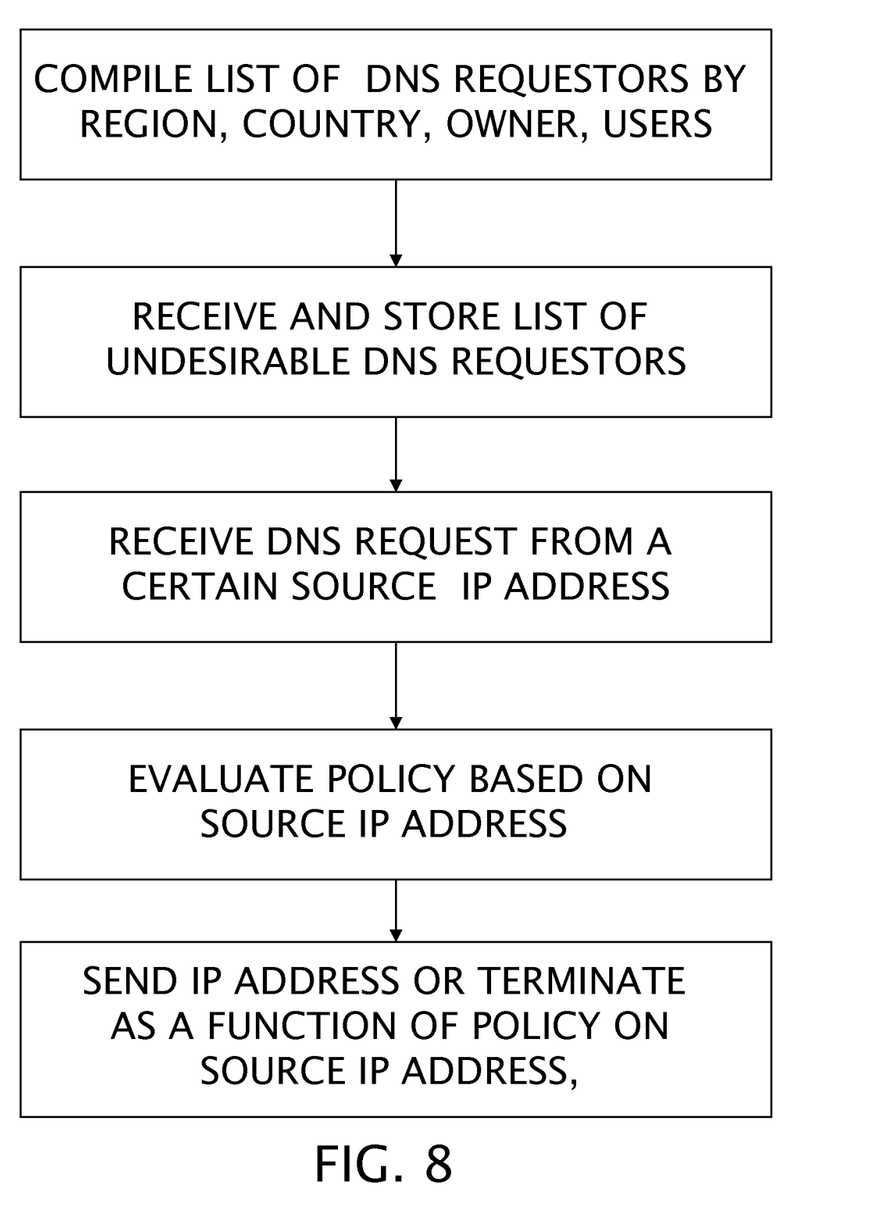

Referring now to FIG. 8, the method further comprises the step of COMPILE LIST OF DNS REQUESTORS BY one of REGION, COUNTRY, OWNER, and USERS. This step can be accomplished at a centralized service and downloaded or at the apparatus itself. An alternative to compiling a list is to look up the record information about the source IP address as needed and this choice is only a practical tradeoff in efficiency.

Figure 9:
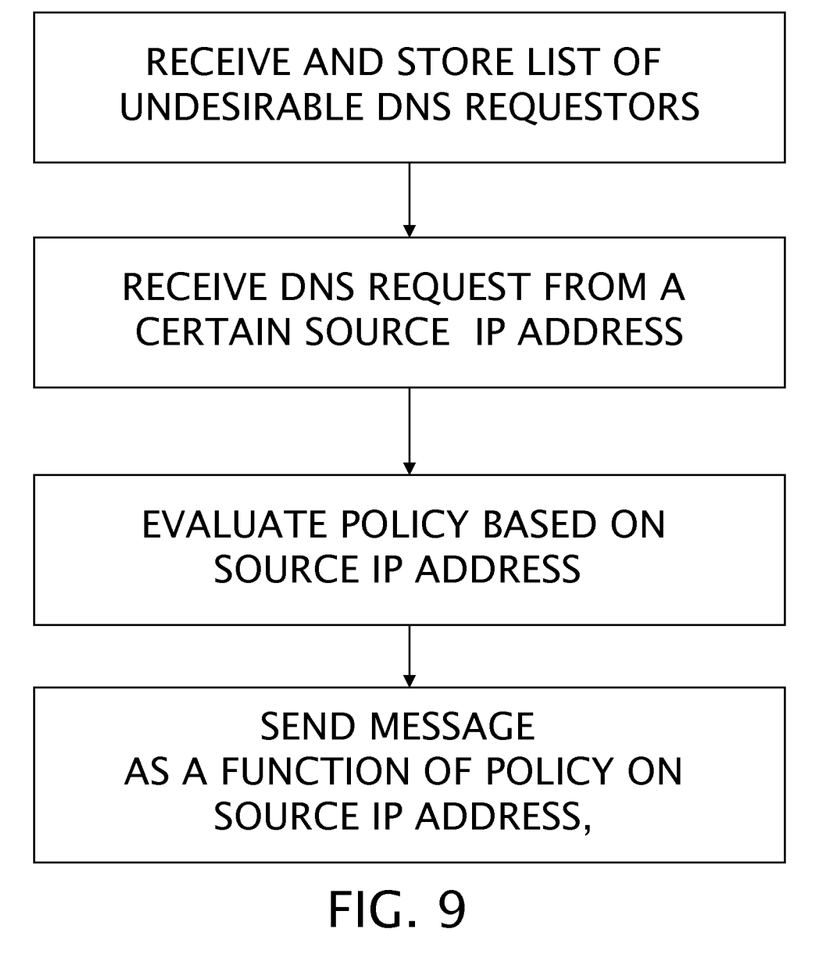

Referring now to FIG. 9, an embodiment of the method enables display of a message to a user or server originating the DNS query.

Figure 10:
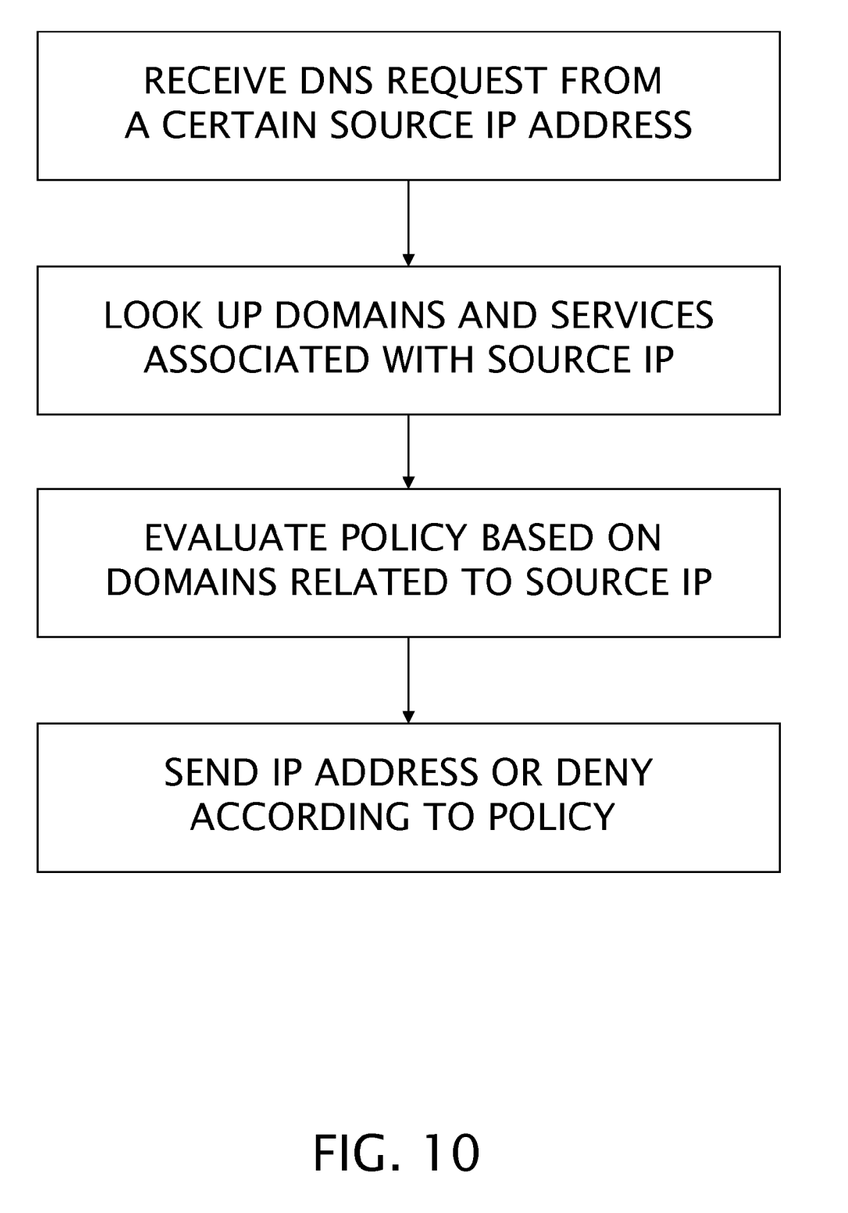

Referring now to FIG. 10, an embodiment of the method further comprises looking up the domains or services associated with a source IP address and evaluating a policy based on the domains or services served by the source IP address.

Figure 11:
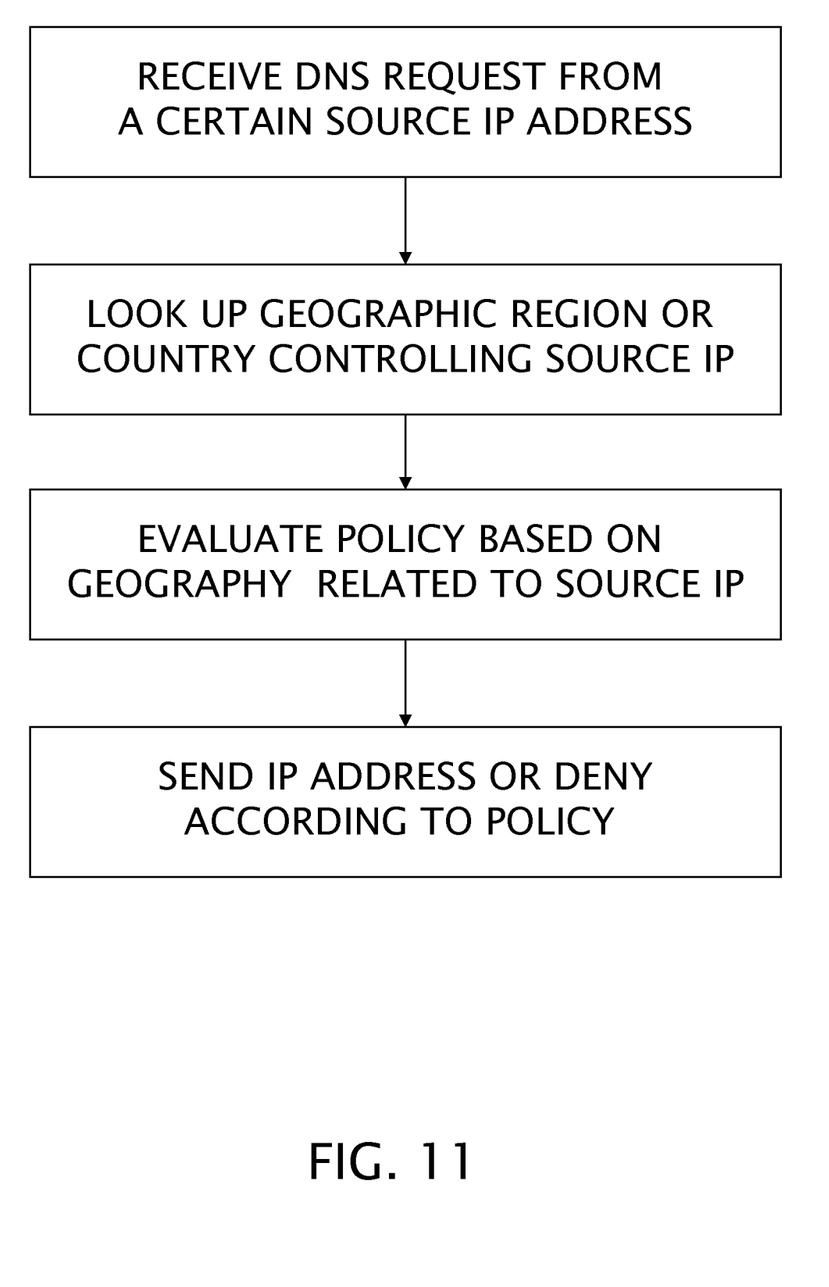

Referring now to FIG. 11, an embodiment of the method enables a policy decision based on the known country or geographical region encoded in the source IP address.

Figure 12:
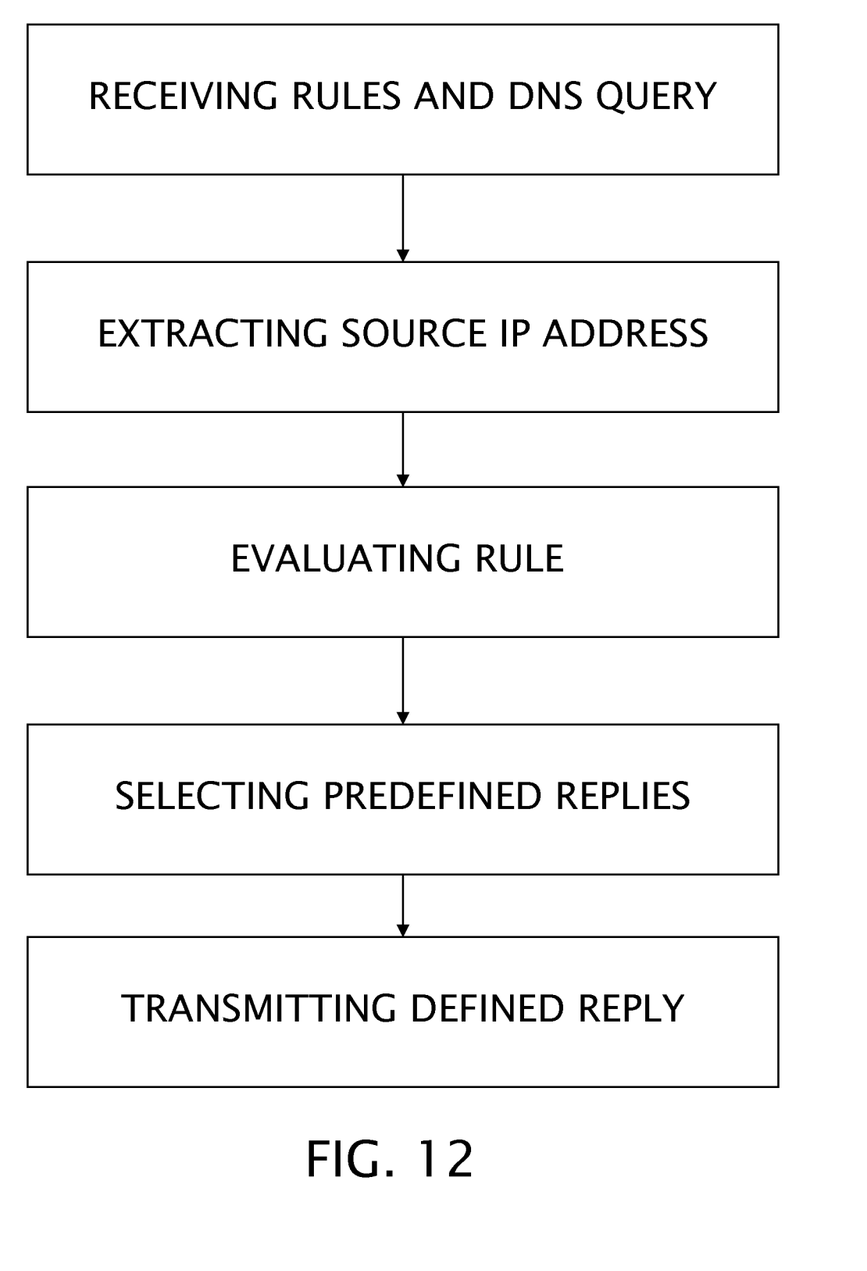

Referring now to FIG. 12, an embodiment of the method comprises the steps of: receiving rules, receiving a DNS query, extracting a source IP address from the DNS query, evaluating at least one rule which is sensitive to the source IP address, selecting from among pre-defined replies according to the most restrictive rule which evaluates as true, and transmitting the selected pre-defined reply to the source IP address. In an embodiment, the process has the steps of receiving algorithms for generating a reply, and generating a reply following the evaluation of a rule.

The figures and illustrations are provided to convey the breadth of embodiments and are not to considered limitations on the claimed invention.

A computer system is disclosed comprising a link circuit for to send and receive packets on the Internet, a processor, and a computer-readable media product that contains a set of computer executable software instructions for directing the computer system to execute a process for policy-based operation of a DNS server apparatus whereby a reply to a DNS query from a sender is selected according to the source IP of the sender or other data of the DNS query packet.

A computer executed method is disclosed encoded as computer executable software instructions on computer-readable media comprising the following steps:
  receiving a UDP containing a DNS query comprising a query name, a query type, query class, from an IP source address and source port at a certain time;
  evaluating at least one rule operating on at least two of the following: time and date, query type and query name, and IP source address; and
  transmitting a pre-identified reply to the source IP address and port.

The present invention defines one non-limiting embodiment of a rule to be a conditional statement and a first consequence if the conditional statement is evaluated as true and a second consequence if the conditional statement is evaluated as false.

In an embodiment, the method of the invention includes evaluating a plurality of rules and selecting the consequence of the most restrictive rule which is evaluated as true, else the consequence is selecting a valid query type and query record data reply if all rules evaluate as false.

In an embodiment the method includes deterministicly selecting a first pre-identified reply as a first consequence and deterministicly selecting a second distinct pre-identified reply as a second consequence wherein the second distinct pre-identified reply is not equivalent in utility to the first pre-identified reply. It is known that conventional servers randomly select from equivalent replies purely for load-balancing purposes. The present invention is distinguished by not randomly selecting a reply. As a non-limiting example of deterministicly selecting we suggest: IF A=true, THEN B, ELSE C.

In an embodiment, a pre-identified reply embeds at least one of the following flag codes in a DNS UDP packet:
  1010 not zone,
  0101 refused,
  0001 name does not exist,
  0010 server failure,
  0100 format error in query.

The default of the invention is a conventional DNS reply such as but not limited to:
  type=A and host IP address;
  type=NS and nameserver IP address; and
  type=MX and mailserver IP address.

In an embodiment a pre-identified reply may be one of the following:
  a fictitious IP address not assigned;
  a loopback IP address;
  an IP address referencing a message; and
  an IP address in the network of the sender.

In an embodiment the server may either not reply at all or transmit a flag 0000 no error and no data. Alternating between the two may identify which behavior elicits minimal further traffic.

In an embodiment the rules do not individually contain IP addresses and are referenced to a process which queries a database encoded on computer-readable media for at least one stored IP address which matches the IP source address.

In an embodiment a match is determined by comparing only the prefix of n bits of the IP source address with a stored IP address and ignoring the remainder of the source IP address.

In an embodiment a match is determined by applying a bitmask to an IP source address and comparing to a database of IP addresses to determine that an IP address is "close enough" to evaluate the rule as "true".

An apparatus is disclosed for policy managed DNS services comprising:
  a circuit to receive a UDP packet;
  a circuit to read from the UDP packet: a source IP address, socket, a query name, a query type, a query class, and a time and date;
  a circuit to implement at least one policy, wherein a policy comprises a rule and a reply to be transmitted if the rule is evaluated to be true and a reply to be transmitted if the rule is evaluated to be false;
  a circuit to evaluate the rule by application of values read from the UDP packet; and
  a circuit to transmit the reply selected by the policy.

The apparatus may be embodied as a computer where the circuit to evaluate the rule comprises a processor and computer readable media encoded with software instructions to evaluate the rule by application of values read from the UDP packet.

Rather than evaluating every rule for every packet, an embodiment may separate the rules from either the IP addresses or the pre-identified replies or both the IP addresses and the pre-identified replies. Thus the apparatus may be embodied with one or more computer-readable media encoded with IP addresses, computer-readable media encoded with at least one rule, and computer-readable media encoded with a plurality of distinct pre-identified replies for each query name. So an embodiment of the invention has the following steps: read a source IP address from a UDP packet, check in a database which, if any, rules use the source IP address, lookup and evaluate each rule, select the consequence of the most restrictive rule which evaluates as true, transmit the pre-identified reply. Using bit-masks or prefix notation reduces the potential number of rules, the volume of pre-identified replies, and the size of the IP address database.

Non-limiting examples of rules include: a rule on IP addresses located in countries, a rule on IP addresses within a range of a spammers' known activity, a rule on a list of IP addresses controlled by commercial or governmental entities, a rule on IP addresses associated with open proxies, and a rule on IP addresses controlled by certain authorities.

An apparatus is disclosed for providing domain name system query service comprising a outsourced policy engine coupled through a network to a policy-based DNS server apparatus which said engine evaluates a policy decision based on the source IP address of a DNS query. In an embodiment, the determination of the need for a policy decision is made based on the source IP address or other data in or determined from the DNS request, a remote server performs complex rule evaluations and returns the selection of the pre-identified reply, and the apparatus can simply transmit the reply. The advantage is to simplify the distributed apparatus, ensure consistency, and expedite processing for queries from IP source addresses not in the database. In an embodiment, the policy engine provides information used to create a reply which is distinguished from giving the exact reply. An example is localization/language provided within the distributed apparatus.

A computer executed method is disclosed of policy translation for providing executable modules to a policy engine comprising the steps of converting an abstract policy on spam, abusive users, sources of malicious software to ranges of IP addresses for use by a policy engine in a domain name system server apparatus.

A computer executed method is disclosed for creating a policy rule for a policy-managed DNS server comprising binding at least one of the following actions to the condition that a source of a DNS request is found in a list of undesirable IP addresses:
  transmitting a code for no such address found;
  transmitting a loopback address;
  transmitting a fictitious address;
  transmitting an address to a fixed message; and
  no reply at all.

An embodiment of the present invention is an informed domain name system server method comprising a system for requesting information having a method for receiving a domain name server request, a method for checking a local cache for an IP address, and a method for requesting DNS resource records from another domain name system server wherein the improvement comprises the steps of sending a query containing an IP address to an informational server, receiving report on the observed previous performance of the host associated with the subject IP address, and suppressing a query or a reply on DNS resource records according to the report.

The computer system of the present invention sets a tangible beneficial circuit signal value whereby load on servers is controlled by refusing an unwanted visitor selected from the group comprising spammers, competitors, agents of hostile governments and organizations, criminal enterprises, and vandals.

The computer system of the present invention sets a tangible beneficial circuit signal value whereby a content provider tailors message language to match the native language associated with the location of source IP address.

The computer system of the present invention sets a tangible beneficial circuit signal value whereby a content provider tailors message content to certain communities.

The computer system of the present invention sets a tangible beneficial circuit signal value whereby a content provider tailors message delivery by day of week and time of day.

The computer system of the present invention sets a tangible beneficial circuit signal value whereby a network refuses access to bots and webcrawlers.

The present invention further comprises providing a blocking response such as no error and no data or refused with pretty long TTL (but not ridiculously long TTL) for requests coming from IP addresses on a list requesting specific records for domain names that are on a list and providing no response to all other cases.

CONCLUSION

The present invention is distinguished from conventional apparatus for providing DNS service which perform their steps for any request they receive. The present invention is distinguished by policy-based management of requests, specifically considering the source IP of a DNS request and selecting from a plurality of potential replies including no reply at all. The present invention makes an informed decision based on policies on the suspected sources of an incident DNS request. It is particularly pointed out that the present invention controls the conventional DNS reply information and determines based on a policy not to provide it to certain requestors depending on their source IP address and the evaluation of rules.

Disclosed is a method, a computer system, and a computer-readable media product that contains a set of computer executable software instructions for directing the computer to execute a process for policy-based operation of a DNS server apparatus to manage traffic due to undesirable mail or requests for electronic documents. The policies operate according to owners, regions, or countries controlling source IP addresses and deterministically select from a plurality of non-equivalent replies to be sent to the source IP address. Accumulating previous activity records may assist in determining which traffic may be usefully deferred or suppressed. The process includes withholding certain information from certain DNS servers seeking IP addresses to improve overall security and integrity of the Internet.

Improved security and reduced network traffic can result from suppressing the replies according to an external information provider. Sources of information can be dynamic measurement of spam or threat activity, known spammers, hostile agencies, defective automation, national countries, geographic location, commercial competitors, preferred clients, or other data on the IP address.

In many circumstances it is desirable to restrict access to certain categories of material on the Internet. This is referred to as content filtering. Motivations include security reasons such as sites which have previously distributed malicious software such as viruses or spyware, and policy reasons such as sites with adult content being inaccessible to children attending certain grade schools. By selectively blocking or modifying DNS requests, content filtering can be performed based on the name or IP address of the requesting host. This is distinguished from a method for reducing latency for any user.

The present invention is distinguished from conventional dns servers by deterministicly selecting from a plurality of replies according to the evaluation of a rule, by evaluating a plurality of rules and selecting the most restrictive rule which evaluates as true, and by sensitizing rules based on bit masks applied to or prefixes of source IP address of the dns query but evaluating rules on values in addition to source IP address such as but not limited to entities controlling IP address blocks.

The present invention discloses a system only starting with IP addresses and extensible by adding complex rules on all parameters which may be obtained by searching a database for information as a non-limiting example a reverse IP DNS database such as one known in the art as (dot).arpa.

Significantly, this invention can be embodied in other specific forms without departing from the spirit or essential attributes thereof, and accordingly, reference should be had to the following claims, rather than to the foregoing specification, as indicating the scope of the invention.

What is claimed is:

1. An apparatus for policy managed DNS services comprising:
    a circuit to receive a UDP packet;
    a circuit to read from the UDP packet: a source IP address, socket, a query name, a query type, a query class, and a time and date;
    a circuit to implement at least one policy, wherein a policy comprises a plurality of rules and for each rule a reply to be transmitted if the rule is evaluated to be true and a reply to be transmitted if the rule is evaluated to be false;
    a circuit to evaluate the plurality of rules by application of values read from the UDP packet; and
    a circuit to transmit the reply selected by the policy;
        wherein the rule is selected from among the following:
    a rule on a list of IP addresses controlled by commercial or governmental entities,
    a rule on IP addresses associated with open proxies, and
    a rule on IP addresses controlled by certain authorities.

2. An outsourced policy engine apparatus for providing domain name system (DNS) query service coupled through a network to a plurality of policy-based DNS server apparatus
    said outsourced policy engine apparatus comprising a computing system comprising a computer platform, external data storage, a network link, an operating system, and computer software;
    said computer software adapted to configure the computer platform to receive from one of the policy-based DNS server apparatus, values read from a DNS query packet, and from a database, evaluate a plurality of rules, and return the result of the most restrictive of the plurality of rules to said one of the policy-based DNS server apparatus;
    said database comprising records of querynames, querytypes, queryclass, source IP addresses and ports, time of day and day of week, by commercial entities, by governmental entities, by certain authorities, and associated with open proxies, webcrawlers, geographical regions, or bot-nets; and
        means for determining the onset of a new cache poisoning or denial of service attack based on data received from a plurality of said policy-based DNS server apparatus coupled through said network to said outsourced policy engine apparatus and means for generating and distributing new rules to each coupled policy-based DNS server apparatus.

3. A computer executed method for operating an outsourced policy engine coupled through a network to a plurality of policy-based DNS server apparatus comprising the steps:
- receiving from one of the policy-based DNS server apparatus, values read from a DNS query packet;
- receiving from a database records of previous performance of hosts associated with the values read from a DNS query packet;
- evaluating a plurality of rules; and
- returning a result of the most restrictive of the plurality of rules to said one of the policy-based DNS server apparatus;

wherein rules include:
a rule on volume or density of queries characteristic of denial of service attacks,
a rule on frequency of queries characteristic of cache poisoning attacks,
a rule on IP addresses within a range of a spammers' known activity,
a rule on a list of IP addresses controlled by commercial or governmental entities,
a rule on IP addresses associated with open proxies, and
a rule on IP addresses controlled by certain authorities.

4. A system for providing informed domain name system (DNS) query service to protect DNS servers from bogus queries designed to poison cache comprising
- a plurality of policy-based DNS server apparatus;
- communicatively coupled through a network to an outsourced policy engine apparatus,
- said outsourced policy engine apparatus coupled to a database of observed previous performance of hosts associated with a host requesting Domain Name System (DNS) services;
- said outsourced policy engine apparatus comprising a computing system comprising a computer platform, external data storage, a network link, an operating system, and computer software;
- said computer software adapted to configure the computer platform to receive from a plurality of the policy-based DNS server apparatus, values read from a DNS query packet, and from said database, evaluate a plurality of rules, and return the result of the most restrictive of the plurality of rules to said one of the policy-based DNS server apparatus;
- said database comprising records of querynames, querytypes, queryclass, source IP addresses and ports, time of day and day of week, ranges of IP addresses controlled by spammers, by commercial entities, by governmental entities, by certain authorities, and associated with open proxies, webcrawlers, geographical regions, or bot-nets;
- which policy engine evaluates a policy decision based on information extracted from a DNS query and used to retrieve values stored in the database and the most restrictive rule of a plurality of rules which evaluates as true.

5. An informed domain name system server method comprising a method for receiving a domain name system server request,
- sending a query containing an IP address extracted from said domain name server request to an informational server,
- receiving a report on the observed previous performance of the host associated with the subject IP address, and deterministicly selecting a pre-identified reply as a first consequence and deterministicly selecting an algorithmically generated reply as a second consequence according to the report; wherein the pre-identified reply comprises an IP address for the requested domain name; the algorithmically generated reply comprises an IP address referencing a message.

* * * * *